United States Patent [19]
Kobayashi

[11] Patent Number: 5,921,364
[45] Date of Patent: Jul. 13, 1999

[54] CENTRIFUGAL CLUTCH

[75] Inventor: Fujio Kobayashi, Hachioji, Japan

[73] Assignee: Kioritz Corporation, Tokyo, Japan

[21] Appl. No.: 08/935,261

[22] Filed: Sep. 22, 1997

[30] Foreign Application Priority Data

Sep. 24, 1996 [JP] Japan .................................. 8-251284

[51] Int. Cl.$^6$ ................................................ F16D 23/10
[52] U.S. Cl. .................................................. 192/105 BA
[58] Field of Search ................................. 192/105 BA

[56] References Cited

U.S. PATENT DOCUMENTS

| | | | |
|---|---|---|---|
| 2,000,713 | 5/1935 | Norris | 192/105 BA X |
| 3,350,955 | 11/1967 | Von Ruden | 192/105 BA |
| 3,367,464 | 2/1968 | Fullerton et al. | 192/105 BA |
| 3,477,555 | 11/1969 | Hazzard | 192/105 BA |
| 3,610,382 | 10/1971 | Makinson | 192/105 BA |
| 3,768,611 | 10/1973 | Frederickson | 192/105 BA |
| 4,625,849 | 12/1986 | Gommel. | |
| 4,756,396 | 7/1988 | Nagashima et al. | 192/105 BA |
| 4,889,215 | 12/1989 | Ohkanda | 192/105 BA X |
| 5,437,356 | 8/1995 | Lohr | 192/105 BA |

FOREIGN PATENT DOCUMENTS

| | | | |
|---|---|---|---|
| 2418697 | 1/1975 | Germany | 192/105 BA |

*Primary Examiner*—Charles A Marmor
*Assistant Examiner*—Ha Ho
*Attorney, Agent, or Firm*—Thelen Reid & Priest LLP

[57] ABSTRACT

A centrifugal clutch has a clutch boss including a hub fixed to a drive shaft, several guides that extend radially from the hub, and clutch shoe retaining flanges that extend radially outward from each of the guides. The centrifugal clutch also has a clutch drum disposed coaxially with the clutch boss and is rotatable about the driving shaft independently from the clutch boss. Clutch shoes are slidably fitted to the guides in a radial direction of the clutch boss, and a spring biases each clutch shoe radially inward. Resilient snaps hold each of the clutch shoes with respect to the clutch boss so that each of the clutch shoes is biased toward each of the flanges in an axial direction of the drive shaft.

4 Claims, 3 Drawing Sheets

CENTRIFUGAL CLUTCH

BACKGROUND OF THE INVENTION

The present invention relates to a centrifugal clutch often used for portable working machines such as a chain saw or the like, and, more particularly, to a centrifugal clutch which can be easily disassembled and assembled and can decrease the manufacturing costs.

DESCRIPTION OF THE PRIOR ART

A centrifugal clutch for transmitting torque by utilizing a centrifugal force generated by rotation of a driving shaft has been conventionally known.

Refferring now to FIGS. 1 and 2, one example of conventional centrifugal clutches 100 comprises a clutch boss 122 including a hub 123 fixed to a driving shaft 112 and three guides 124, each of which radially extending from the hub 123, a clutch drum (not shown) disposed coaxially with the clutch boss 122 and being rotatable about the driving shaft 112 independently from the boss 122, three clutch shoes 126, each of which being fitted onto each guide 124 and being slidable in a radially outward direction of the clutch boss 122, and a ring-shaped coil spring 125 for biasing each clutch shoe 126 in a radially inward direction.

Rotation of the driving shaft 112 causes the clutch boss 122 to rotate. Each of three clutch shoes 126 slides in the radially outward direction by a centrifugal force generated by the rotation of the clutch boss 122 against a biasing force of the coil spring 125 to cause each clutch shoe 126 to frictionally engage with the clutch drum. The clutch drum is rotated thereby and transmits a driving force to a device such as a cutter or the like.

Side panels 160 of a substantially sector shape are attached to each clutch shoe 126 so that each clutch shoe 126 does not move in an axial direction of the driving shaft 112. Each side panel 160 is fixed to the clutch shoe 126 by screws 162 as shown in FIG. 1. As a result, each guide 124 of the clutch boss 122 is interposed between the side panel 160 and the clutch shoe 126. Therefore, when the clutch boss 122 is disassembled from the driving shaft 112 in the axial direction, the side panels 160, the clutch boss 122 and the clutch shoes 126 can be removed as one unit. That is, the clutch shoes 126 and the side panels 160 shall not fall apart when the clutch boss 122 is taken out.

However, Fixing the side panels 160 to the clutch shoes 126 by using parts such as screws 162 causes to increase a number of parts and the manufacturing costs and require longer assembly and disassembly time.

As depicted in FIG. 5, the flanges 36 which correspond to the side panels 160 could be integrally formed with a clutch boss 22 which corresponds to the clutch boss 122. Such a centrifugal clutch 10 would be advantageous in respect of decreasing a number of parts and the costs and simplifying assembly operations.

However, in such a centrifugal clutch 10, when the clutch boss 22 were removed, the integrally formed flange 36 would be removed therewith which causes the clutch shoes 26 to fall apart and complicates the disassembly operation.

SUMMARY OF THE INVENTION

It is, therefore, an object of the present invention to provide a centrifugal clutch which enables to decrease the manufacturing costs and simplifies assembly and disassembly operations thereof.

The above and other objects of the present invention can be accomplished by a centrifugal clutch comprising: a) a clutch boss including a hub fixed to a driving shaft, a plurality of guides, each of which radially extending from the hub, and clutch shoe retaining flanges, each of which extending radially outward from each of the guides; b) a clutch drum disposed coaxially with the clutch boss and being rotatable about the driving shaft independently from the clutch boss; c) a plurality of clutch shoes, each of which slidably fitted to each of the guides in a radial direction of the clutch boss; d) biasing means for forcing each clutch shoe in a radially inward direction; and e) holding means for holding each of the clutch shoes with respect to the clutch boss so that each of the clutch shoes is biased toward each of the flanges in an axial direction of the driving shaft.

In a preferred aspect of the present invention, each of the clutch shoes having two guide leg portions, each of which extends in the radially inward direction, the guide leg portions having opposing sliding inner surfaces which slidably contact with each of the guides, the holding means including a substantially U-shaped snap having two opposing snap leg portions for pinching outer side surfaces of the guide leg portions in a direction perpendicular to an elongated axis of the guide leg portions; and each of the snap leg portions having a hook portion at an end thereof, the hook portion being bent toward a rear surface of the clutch shoe retaining flange for biasing the clutch boss toward the clutch shoes.

In a further preferred aspect of the present invention, each of the clutch shoe retaining flanges having depressed portions on both side surfaces thereof for retaining the snap.

In a still further preferred aspect of the present invention, a washer mounted on the driving shaft at a location opposite from the clutch shoe retaining flanges with respect to the clutch shoes, one side surface of the washer defining a stopper surface for the clutch shoes and the clutch boss in the axial direction, and an abutment surfaces of the guide leg portions of the clutch shoes and the guides which engages with the stopper surface of the washer having depressed portions for retaining the snaps so that outer surfaces of the snap is flush with the abutment surfaces.

In a still further preferred aspect of the present invention, the biasing means being a ring-shaped coil spring, each of the clutch shoes having a spring retaining groove, each of the clutch shoe retaining flanges extending from the guide in the radially outward direction to cover the spring retaining groove.

The above and other objects and features of the present invention will become apparent from the following description made with reference to the accompanying drawings.

DESCRIPTION OF THE PREFERRED EMBODIMENTS

Figure 1:
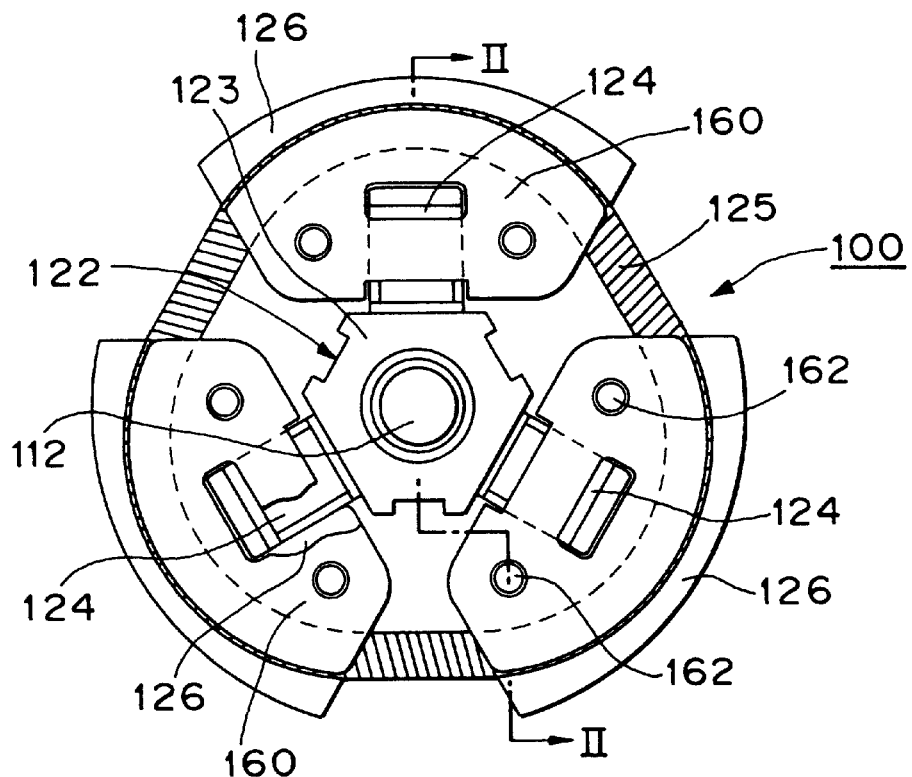
FIG. 1 is a plan view of a conventional centrifugal clutch.
Figure 2:
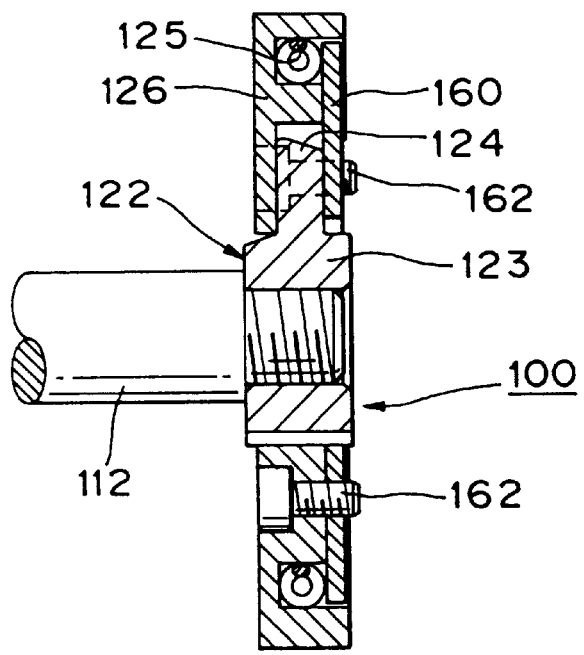
FIG. 2 is a cross-sectional view of the centrifugal clutch taken along line II—II in FIG. 1.
Figure 3:
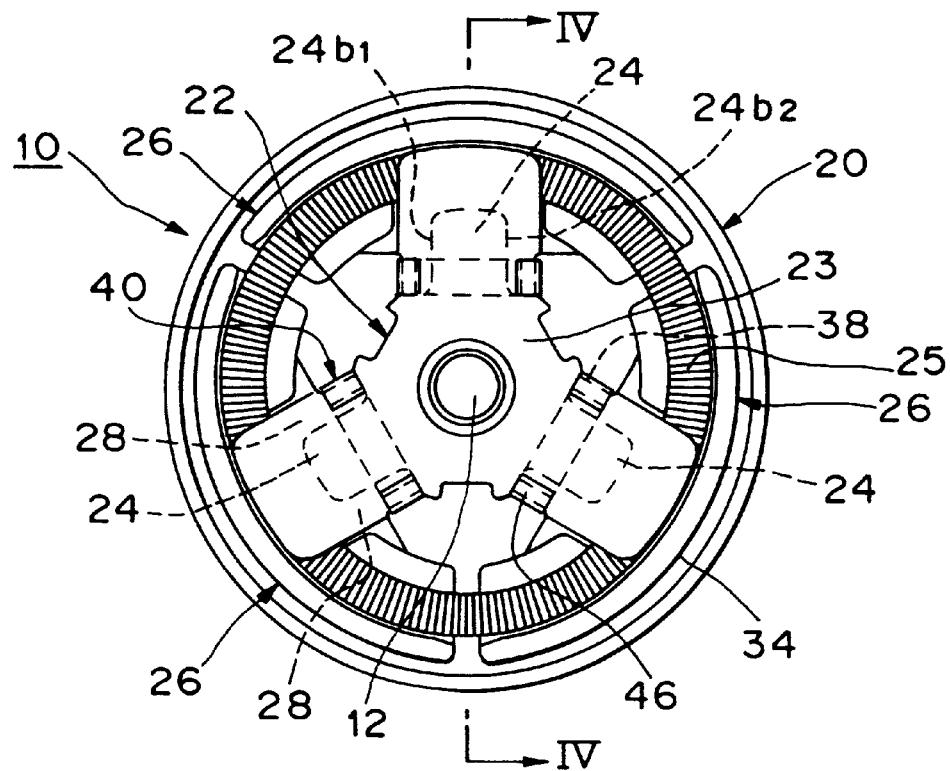
FIG. 3 is a plan view of an embodiment of a centrifugal clutch in accordance with the present invention.
Figure 4:
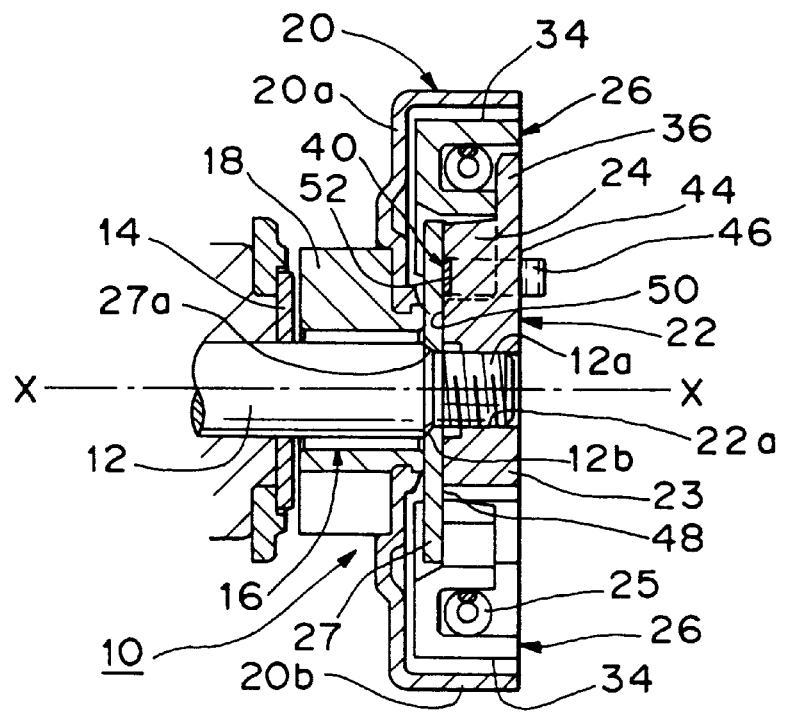
FIG. 4 is a cross-sectional view of the centrifugal clutch along line IV–IV in FIG. 3.
Figure 5:
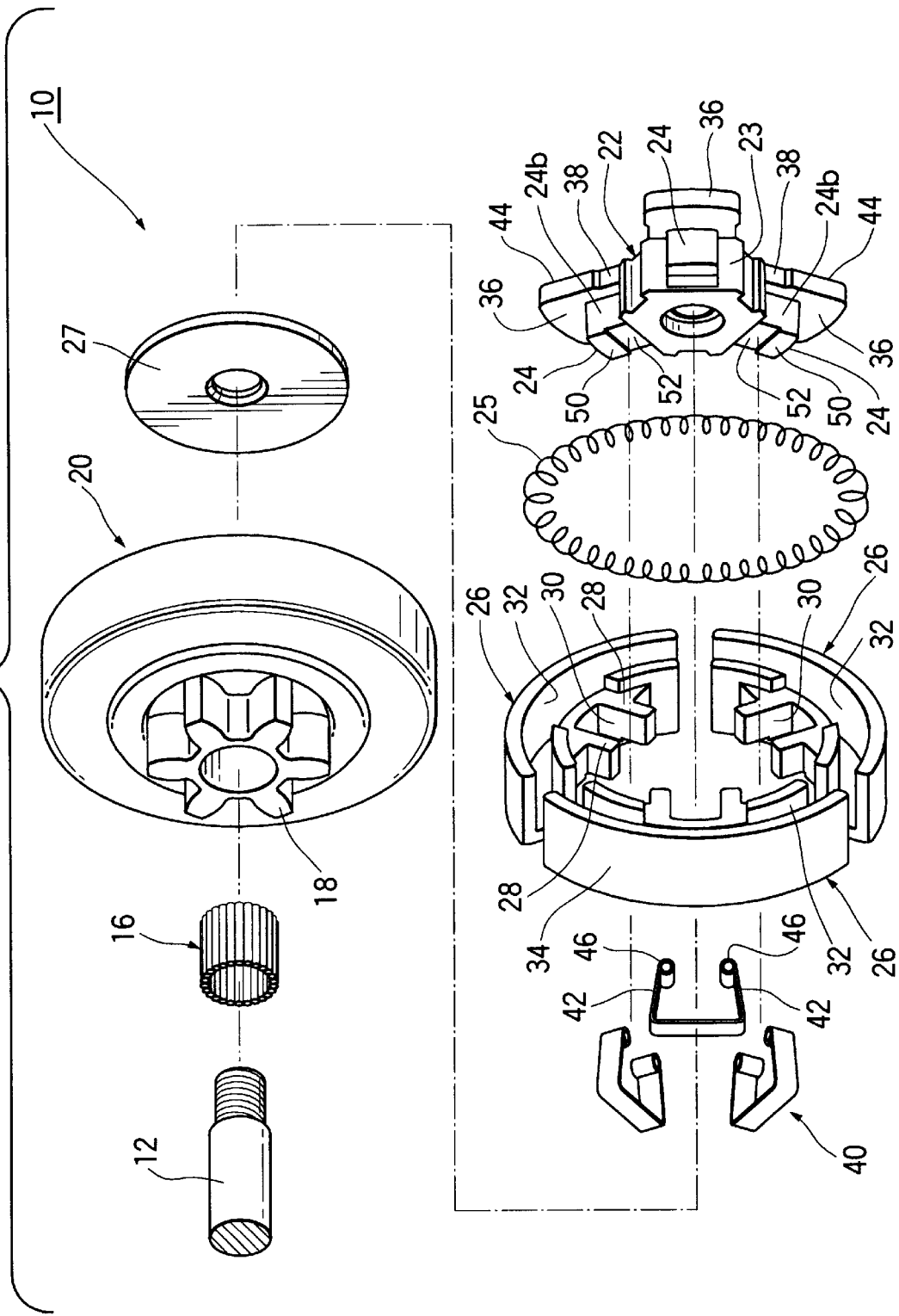
FIG. 5 is a perspective view showing disassembled parts of the centrifugal clutch in accordance with the embodiment of the present invention.

A centrifugal clutch 10 embodying the principles of this invention is shown best in FIGS. 3 through 5. Referring now to FIGS. 3 and 4, a driving shaft 12 is inserted into a thrust washer 14 and needle rollers 16 to be mounted on one end thereof. The driving shaft 12 may be a crank shaft of a small size air cooled type two-cycle internal combustion engine. A sprocket 18 such as a driving sprocket for a saw chain of a chain saw is rotatably supported by the driving shaft 12 via the needle rollers 16. A clutch drum 20 is fixed to a side surface of the sprocket 18 so as to rotate therewith. The clutch drum 20 comprises a circular plate portion 20a fixed to the sprocket 18 and a frictionally engageable annular portion 20b extending a predetermined length from a circumference of the circular plate portion 20a in a perpendicular direction with respect to an axis X—X of the driving shaft 12.

The driving shaft 12 includes a tapered portion 12b located next to the portion which supports the sprocket 18. The end portion of the driving shaft 12 next to the tapered portion 12b includes a male threaded portion 12a.

A hub 23 at the center of a clutch boss 22 is provided with a female threaded hole 22a which is threadably engaged with the male threaded portion 12a of the driving shaft 12. A circular washer 27 having a center hole with a tapered circumference 27a is inserted onto the driving shaft 12. Then, the clutch boss 22 is fixed to the driving shaft 12 by threadably engaging the male threaded portion 12a of the driving shaft 12 with the female threaded hole 22a of the clutch boss 22 so that the tapered circumference 27a of the center hole of the washer 27 mates with the tapered portion 12b of the driving shaft 12. The clutch boss 22 rotates with the driving shaft 12 independently from the sprocket 18. The clutch boss 22 has three guides 24, each of which extending in a radial direction so as to be disposed at 120 degrees intervals from each other in a circumferential direction. As shown in FIG. 3, each guide 24 has radially extending slide surfaces $24b_1$, $24b_2$ on the left and right sides thereof.

Each clutch shoe 26 is fitted to each guide 24 so that it slides on the side surfaces $24b_1$, $24b_2$ in a radial direction of the clutch boss 22. As clearly indicated in FIG. 5, each clutch shoe 26 has two guide leg portions 28 which extend in a radially inward direction. Each of the guide leg portions 28 has opposing sliding inner surfaces 30 which slidably contact with the side surfaces $24b_1$, $24b_2$ of the guide 24. The clutch shoe 26 is of a substantially sector shape. It is provided with an arcuate spring retaining groove 32 on a side surface thereof which is opposite from the circular plate portion 20a of the clutch drum 20. It also includes a lining portion 34 integrally formed therewith. A ring-shaped coil spring 25 is placed in the spring retaining grooves 32 to bias each clutch shoe 26 in the radially inward direction.

Extending from each guide 24 is a clutch shoe retaining flange 36 which is integrally formed with the clutch boss 22. It extends radially outward from the end of the guide 24 to cover an opening of the spring retaining groove 32. The clutch shoe retaining flange 36 has depressed portions 38 on left and right side surfaces thereof for retaining holding means or a snap 40 which shall be explained in detail herein below.

Each snap 40 is made of, for example, a resilient metal piece. As best seen in FIG. 5, it is formed substantially in a U-shape having two opposing leg portions 42 for pinching outer surfaces of the guide leg portions 28 of the clutch shoe 26 when inserted in a direction perpendicular to an elongated direction of the guide leg portions 28. Further, at the end of each leg portion 42 is provided with a hook portion 46 of a loop shape which is bent toward a rear surface 44 of the clutch shoe retaining flange 36 for biasing the clutch boss 22 toward the clutch shoes 26. The snap 40 may be made of a material such as resilient metal which is capable of holding or retaining each clutch shoe 26 with respect to the clutch boss 22 by biasing each clutch shoe 26 toward each clutch shoe retaining flange 36.

A side surface of the washer 27 opposite from the circular plate portion 20a of the clutch drum 20 defines a stopper surface 48 for the clutch shoes 26 and the clutch boss 22 in the direction of the axis X—X. Abutment surfaces 50 of the guide leg portion 28 and the guides 24 (see FIG. 5) which abut with the stopper surface 48 are formed with depressed portions 52 for retaining the snaps 40 so that an outer surface of the snap 40 shall be flush with the abutment surfaces 50.

The centrifugal clutch 10 of the foregoing embodiment functions as follows. When an engine is started, the driving shaft 12 starts rotating, whereby the clutch boss 22 fixed to the driving shaft 12 also starts rotating therewith. When rotational speed of the engine reaches a predetermined value, the clutch shoes 26 slidably supported by the clutch boss 22 starts moving in a radially outward direction by a centrifugal force against the spring force of the coil spring 25. As the rotational speed increases, the lining portions 34 disposed on the outer peripheral surface of the clutch shoes 26 frictionally engage with a inner peripheral surface of the annular portion 20b of the clutch drum 20 to rotate therewith, i.e., the clutch is engaged. Once it is engaged, torque of the engine is transmitted to a device such as a cutting device via the sprocket 18 which rotates with the clutch drum 20.

Refferring to FIG. 5, a disassembly procedure shall be explained. First, the clutch boss 22 is rotated in a direction of disengaging the clutch boss 22 from the driving shaft 12 and is removed from the driving shaft 12 through the opening of the clutch drum 20. Since each clutch shoe 26 is held to the clutch boss 22 by the snap 40, the clutch boss 22 and the clutch shoes 26 can be easily removed from the driving shaft 12 as one unit while the coil spring 25 is retained in the spring retaining groove 32. Then, the snaps 40 are removed from the unit in a direction along the axis X—X to disassemble each clutch shoe 26 from the clutch boss 22.

The centrifugal clutch can be assembled by following the same procedure in a reverse order. Therefore, explanations therefor shall be omitted. As for the disassembly operations, by utilizing the snaps 40, each clutch shoe 26 can be assembled to the clutch boss 22 by simply snapping it thereon in one step.

The present invention has thus been shown and described with reference to specific embodiments. However, it should be noted that the present invention is in no way limited to the details of the described arrangements but changes and modifications may be made without departing from the scope of the appended claims.

For example, the number of clutch shoes is not limited to three and can be determined according to, for example, the torque to be transmitted.

Furthermore, a tension spring which is connected to each clutch shoe or a compression spring which interconnects between the clutch boss and the clutch shoes can be employed instead of the coil spring to bias the clutch shoes in, the radially inward direction.

As previously explained, in accordance with the centrifugal clutch of the present invention, since the clutch shoe retaining flanges are integrally provided with the clutch boss, fixing parts such as bolts can be eliminated which results in a decrease in the manufacturing costs. Further, the holding means enables to assemble or disassemble the clutch boss and the clutch shoes as one unit without falling apart while free movement of the clutch shoes in a radial direction with respect to the clutch boss is assured when rotated.

I claim:

1. A centrifugal clutch, comprising:
   a) a clutch boss including:
      1) a hub fixed to a driving shaft,
      2) a plurality of guides, each of which radially extends from said hub, and
      3) clutch shoe retaining flanges, each of which extends radially outward from each of said guides;
   b) a clutch drum disposed coaxially with said clutch boss and being rotatable about said driving shaft independently from said clutch boss;
   c) a plurality of clutch shoes, each of which is slidably fitted to each of said guides in a radial direction of said clutch boss;
   d) biasing means for forcing each clutch shoe in a radially inward direction; and
   e) resilient holding means for resiliently holding each of said clutch shoes with respect to said clutch boss so that each of said clutch shoes is biased toward each of said flanges in an axial direction of said driving shaft;
   wherein:
      1) each of the clutch shoes has two guide leg portions extending in a radially inward direction and having opposing sliding inner surfaces that slidably contact with each of the guides;
      2) the holding means includes a substantially U-shaped snap having two opposing snap leg portions for pinching outer side surfaces of the guide leg portions in a direction perpendicular to an elongated axis of the guide leg portions; and
      3) each of the snap leg portions has a hook portion at an end thereof, the hook portion being bent toward a rear surface of the clutch shoe retaining flange for biasing the clutch boss toward the clutch shoes.

2. A centrifugal clutch in accordance with claim 1, wherein:
   each of said clutch shoe retaining flanges having depressed portions on both side surfaces thereof for retaining said snap.

3. A centrifugal clutch in accordance with claim 2, further comprising:
   a washer mounted on said driving shaft at a location opposite from said clutch shoe retaining flanges with respect to said clutch shoes, one side surface of said washer defining a stopper surface for said clutch shoes and said clutch boss in said axial direction; and
   an abutment surfaces of said guide leg portions of said clutch shoes and said guides which engages with said stopper surface of said washer having depressed portions for retaining said snaps so that outer surfaces of said snap is flush with said abutment surfaces.

4. A centrifugal clutch in accordance with claim 3, wherein:
   said biasing means being a ring-shaped coil spring, each of said clutch shoes having a spring retaining groove, each of said clutch shoe retaining flanges extending from said guide in the radially outward direction to cover said spring retaining groove.

* * * * *